(12) United States Patent
Suntharalingam

(10) Patent No.: US 10,564,662 B2
(45) Date of Patent: Feb. 18, 2020

(54) SYSTEMS AND METHODS FOR DETERMINING PEDAL ACTUATOR STATES

(71) Applicant: GM GLOBAL TECHNOLOGY OPERATIONS LLC, Detroit, MI (US)

(72) Inventor: Piranavan Suntharalingam, Scarborough (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 259 days.

(21) Appl. No.: 15/620,360

(22) Filed: Jun. 12, 2017

(65) Prior Publication Data
US 2018/0356853 A1    Dec. 13, 2018

(51) Int. Cl.
| | | |
|---|---|---|
| *G05G 1/38* | (2008.04) | |
| *B60T 8/172* | (2006.01) | |
| *B60K 23/02* | (2006.01) | |
| *B60K 26/02* | (2006.01) | |
| *B60T 8/17* | (2006.01) | |
| *B60T 17/22* | (2006.01) | |

(52) U.S. Cl.
CPC .............. *G05G 1/38* (2013.01); *B60K 23/02* (2013.01); *B60K 26/02* (2013.01); *B60T 8/17* (2013.01); *B60T 8/172* (2013.01); *B60T 17/22* (2013.01); *B60T 2220/04* (2013.01); *B60T 2270/406* (2013.01); *B60Y 2400/301* (2013.01); *B60Y 2400/305* (2013.01); *G05G 2700/02* (2013.01)

(58) Field of Classification Search
CPC . B60T 8/17; B60T 8/172; B60T 17/22; B60T 2220/04; B60T 2270/40; G05G 1/38; B60K 26/02

USPC ........................................................... 701/70
See application file for complete search history.

(56) References Cited

U.S. PATENT DOCUMENTS

| | | | | |
|---|---|---|---|---|
| 4,294,162 A | * | 10/1981 | Fowler ................. | G05D 1/0061 244/223 |
| 4,641,517 A | * | 2/1987 | Spock ....................... | G05B 9/03 701/100 |
| 5,015,043 A | * | 5/1991 | Resch ................... | B60T 8/4275 180/197 |
| 5,841,537 A | * | 11/1998 | Doty ...................... | G01C 19/72 356/484 |
| 5,945,943 A | * | 8/1999 | Kalafus .................. | G01S 19/15 342/33 |
| 5,954,407 A | * | 9/1999 | Schramm ................ | B60T 7/042 303/113.4 |
| 9,562,576 B2 | * | 2/2017 | Hodrus ................... | F16D 48/06 |
| 2001/0028194 A1 | * | 10/2001 | Isono ..................... | B60T 8/367 303/122 |
| 2002/0153771 A1 | * | 10/2002 | Obuchi ................. | B60T 8/4081 303/155 |
| 2002/0158511 A1 | * | 10/2002 | Baumgartner .......... | B60T 7/042 303/199 |

(Continued)

*Primary Examiner* — Richard A Goldman
(74) *Attorney, Agent, or Firm* — Lorenz & Kopf, LLP

(57) ABSTRACT

A method of determining the state of a pedal actuator system within a vehicle includes receiving a position sensor signal indicative of a position of an actuator pedal within the pedal actuator system, receiving a force sensor signal indicative of a compressive force applied to the actuator pedal, and determining, with a processor, a state of the actuator pedal based on the position sensor signal and the force sensor signal. The state of the actuator pedal is one of a normal operating state and a fault state.

14 Claims, 3 Drawing Sheets

(56) References Cited

U.S. PATENT DOCUMENTS

| | | | |
|---|---|---|---|
| 2004/0099468 A1* | 5/2004 | Chernoff | B60T 7/085 180/409 |
| 2005/0092294 A1* | 5/2005 | Gregorio | F02D 11/105 123/399 |
| 2005/0131613 A1* | 6/2005 | Bohm | B60T 7/042 701/71 |
| 2005/0173980 A1* | 8/2005 | Bohm | B60T 7/042 303/155 |
| 2006/0092856 A1* | 5/2006 | Mitsumori | H04L 1/22 370/254 |
| 2006/0163939 A1* | 7/2006 | Kuramochi | B60T 8/885 303/122.04 |
| 2008/0218198 A1* | 9/2008 | Yasuda | G01R 31/3004 326/16 |
| 2010/0131801 A1* | 5/2010 | Baleani | G06F 11/1641 714/37 |
| 2010/0275879 A1* | 11/2010 | Garon | F02D 11/106 123/399 |
| 2011/0046863 A1* | 2/2011 | Tezuka | F01D 21/02 701/100 |
| 2013/0025273 A1* | 1/2013 | Nozawa | B60T 7/042 60/545 |
| 2013/0082514 A1* | 4/2013 | Murakami | B60T 13/686 303/14 |
| 2013/0257062 A1* | 10/2013 | Sakakibara | F02N 11/087 290/38 R |
| 2013/0304793 A1* | 11/2013 | Sasaki | G06F 11/182 709/201 |
| 2014/0110997 A1* | 4/2014 | Biller | B60T 8/4081 303/9.62 |
| 2014/0152085 A1* | 6/2014 | Biller | B60T 8/4081 303/10 |
| 2015/0203115 A1* | 7/2015 | Fairgrieve | B60W 50/087 701/93 |
| 2016/0200353 A1* | 7/2016 | Sasaki | B62D 5/049 701/43 |
| 2017/0022925 A1* | 1/2017 | Kim | F02D 41/3082 |
| 2017/0036659 A1* | 2/2017 | Murakami | B60T 7/042 |
| 2018/0025558 A1* | 1/2018 | Chen | G07C 5/0808 701/29.7 |
| 2018/0186352 A1* | 7/2018 | Goto | B60L 7/18 |
| 2018/0356853 A1* | 12/2018 | Suntharalingam | B60T 8/172 |

* cited by examiner

SYSTEMS AND METHODS FOR DETERMINING PEDAL ACTUATOR STATES

TECHNICAL FIELD

The present disclosure generally relates to vehicles, and more particularly relates to systems for determining the state of various pedals (such as brake, accelerator, and clutch pedals) used to control such vehicles.

BACKGROUND

Modern vehicles typically incorporate a wide variety of sensors and controllers, many of which (such as brake pedal actuators and accelerator pedal actuators) may be implemented as electronic "fly-by-wire" systems rather than mechanically controlled systems. Such electronic implementations avoid the bulky and costly hydraulic system components used in traditional vehicles, but since they do not provide direct feedback between the drive input and the actuator response, these assemblies are preferably monitored continuously by the controller to ensure correct functionality and to detect fault conditions. While such systems are highly effective and safe, there remains a need for systems that provide increased confidence regarding the state of the pedal actuator systems used for vehicle control.

Accordingly, it is desirable to provide improved systems and methods capable of detecting, with a high degree of confidence, the state of pedal actuators used in vehicles and other moving platforms. Furthermore, other desirable features and characteristics of the present invention will become apparent from the subsequent detailed description and the appended claims, taken in conjunction with the accompanying drawings and the foregoing technical field and background.

SUMMARY

Systems and methods are provided for controlling a vehicle. In one embodiment, a method of determining the state of a pedal actuator system within a vehicle includes receiving a position sensor signal indicative of a position of an actuator pedal within the pedal actuator system, receiving a force sensor signal indicative of a compressive force applied to the actuator pedal, and determining, with a processor, a state of the actuator pedal based on the position sensor signal and the force sensor signal. The state of the actuator pedal is one of a normal operating state and a fault state.

In one embodiment, the actuator pedal is a brake pedal. In another embodiment, the actuator pedal is an acceleration pedal.

In one embodiment, the method further includes performing a remedial action if the state of the actuator pedal is a fault state.

In one embodiment, the remedial action includes at least one of providing a notification of the fault state, modifying the braking of the vehicle, and modifying an acceleration of the vehicle.

In one embodiment, determining the state of the actuator pedal includes determining that the actuator pedal is in the fault state when the force sensor signal indicates a non-zero force, but position sensor signal indicates that actuator pedal has not moved beyond a rest state.

In one embodiment, determining the state of the actuator pedal includes determining that the actuator pedal is in the fault state when the force sensor signal indicates zero force, but position sensor signal indicates that the actuator pedal has moved beyond a rest state.

In one embodiment, the method includes performing a diagnostic test of the position sensor assembly and the force sensor assembly prior to determining the state of the actuator pedal.

In one embodiment, a pedal state determination system for a vehicle includes a pedal actuator system and a pedal state determination module. The pedal actuator system includes an actuator pedal, a force sensor assembly configured to produce a force sensor signal indicative of a force applied to the actuator pedal, and a position sensor assembly configured to produce a position sensor signal indicative of the position of the actuator pedal. The pedal state determination module, which includes a processor, is configured to determine a state of the actuator pedal based on the position sensor signal and the force sensor signal, wherein the state of the actuator pedal is one of a normal operating state and a fault state.

In one embodiment, the actuator pedal is a brake pedal. In one embodiment, the actuator pedal is an acceleration pedal.

In one embodiment, the pedal state determination module performs a remedial action if the state of the actuator pedal is a fault state.

In one embodiment, the remedial action includes at least one of providing a notification of the fault state, modifying the braking of the vehicle, and modifying an acceleration of the vehicle.

In one embodiment, the pedal state determination module determines that the actuator pedal is in the fault state when the force sensor signal indicates a non-zero force, but position sensor signal indicates that actuator pedal has not moved beyond a rest state.

In one embodiment, the pedal state determination module determines that the actuator pedal is in the fault state when the force sensor signal indicates zero force, but position sensor signal indicates that the actuator pedal has moved beyond a rest state.

In one embodiment, the pedal state determination module performs a diagnostic test of the position sensor assembly and the force sensor assembly prior to determining the state of the actuator pedal.

A vehicle in accordance with one embodiment includes: a pedal actuator system comprising an actuator pedal, a force sensor assembly configured to produce a force sensor signal indicative of a force applied to the actuator pedal, and a position sensor assembly configured to produce a position sensor signal indicative of the position of the actuator pedal; and a pedal state determination module, including a processor, configured to determine a state of the actuator pedal based on the position sensor signal and the force sensor signal, wherein the state of the actuator pedal is one of a normal operating state and a fault state.

In one embodiment, the actuator pedal is a brake pedal.

In one embodiment, the pedal state determination module determines that the actuator pedal is in the fault state when the force sensor signal indicates a non-zero force, but the position sensor signal indicates that actuator pedal has not moved beyond a rest state.

In one embodiment, the pedal state determination module determines that the actuator pedal is in the fault state when the force sensor signal indicates zero force, but the position sensor signal indicates that the actuator pedal has moved beyond a rest state.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
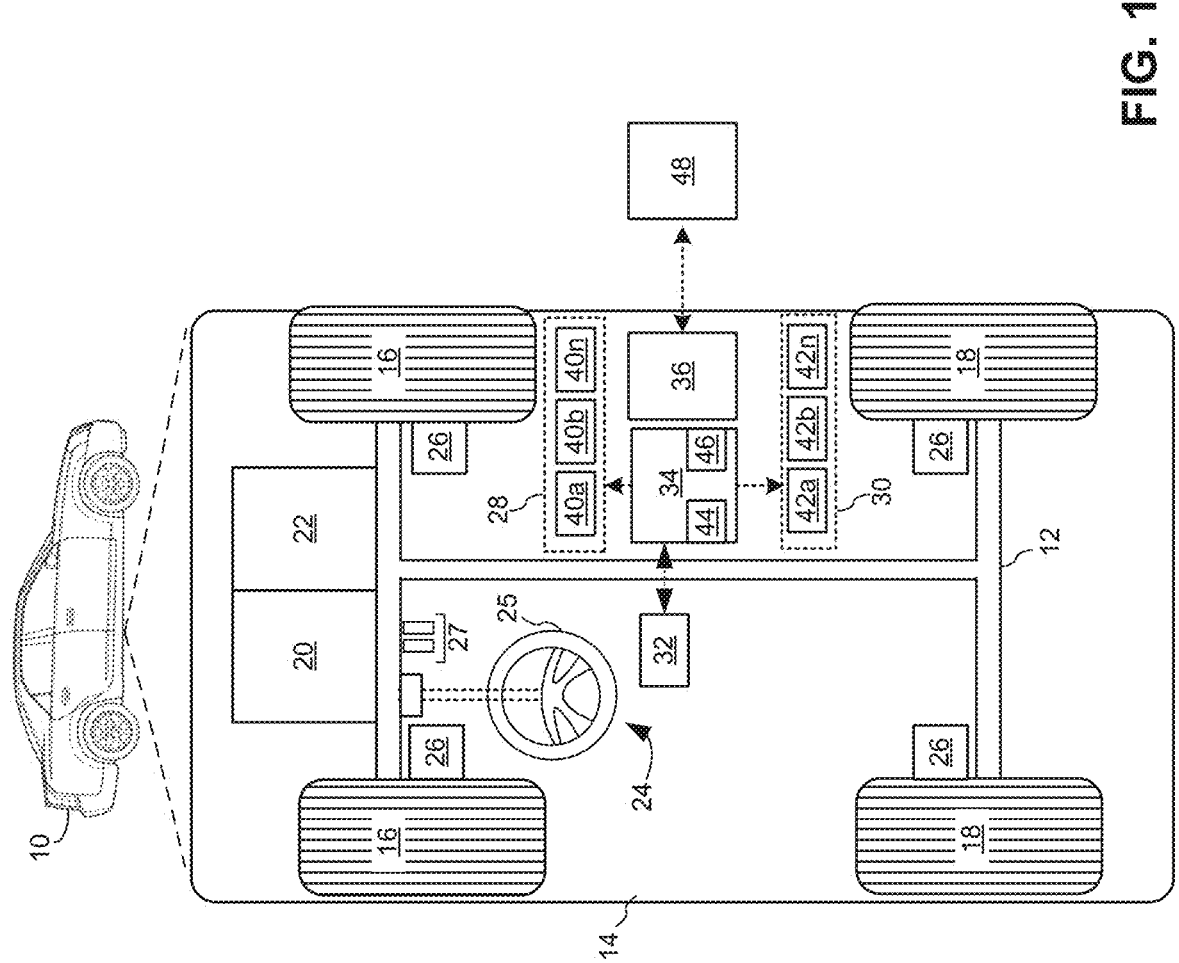
FIG. 1 is a functional block diagram illustrating an exemplary vehicle having a system for detecting the state of a restraint system in accordance with various embodiments.

Systems and methods are described for determining the state of a pedal actuator (e.g., a brake pedal or an accelerator pedal) using both a force sensor and a position sensor coupled to the pedal actuator. By comparing the signals received from the force and position sensors, and assessing whether those signals are consistent, the system can, with a high level of confidence, determine whether the pedal actuator is in a normal operating state or a fault state. For example, the system might determine that a fault has occurred (e.g., the pedal is stuck) when the force sensor senses that no force is being applied to the pedal yet the pedal is displaced from its rest position by a non-zero amount. Similarly, the system might detect a fault condition when force is being applied to the pedal but the pedal has not moved beyond its rest position.

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to RF sensing, vehicle restraint systems, signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

With reference to FIG. 1, a vehicle 10 employing a system in accordance with various embodiments generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, vehicle 10 is characterized by some level of autonomy. For example, vehicle 10 may correspond to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. Furthermore, construction detection systems in accordance with the present embodiment may be used in conjunction with any vehicle that utilizes a navigation system to provide route guidance. Furthermore, vehicle 10 may be a traditional, non-vehicle.

While vehicle 10 is depicted in the illustrated embodiment as a passenger car, it should be appreciated that any type of vehicle, including motorcycles, trucks, sport utility vehicles (SUVs), recreational vehicles (RVs), marine vessels, aircraft, and other movable platforms employing a restraint system may also employ the various methods and systems described herein.

Referring again to FIG. 1, vehicle 10 generally includes a propulsion system 20, a transmission system 22, a steering system 24, a brake system 26, one or more pedal actuator assemblies 27, a sensor system 28, an actuator system 30, at least one data storage device 32, at least one controller 34, and a communication system 36 for communicating with an external system 48. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems. Brake system 26 may be actuated via one of the pedal actuator systems 27.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n might include, but are not limited to, radars, lidars, global positioning systems, optical cameras, thermal cameras, ultrasonic sensors, force sensors and position sensors (used, for example, in conjunction with pedal actuator assemblies 27) and/or other sensors.

Actuator system 30 includes one or more actuator devices 42a-42n that control one or more vehicle features such as, but not limited to, the propulsion system 20, the transmission system 22, the steering system 24, and the brake system 26. In various embodiments, vehicle 10 may also include interior and/or exterior vehicle features not illustrated in FIG. 1, such as various doors, a trunk, and cabin features such as air, music, lighting, touch-screen display components (such as those used in connection with navigation systems), and the like. One or more of actuator devices 42a-42n may be controlled via pedal actuator assemblies 27, which might include, for example, a brake pedal, an accelerator pedal, a clutch pedal, and the like.

The data storage device 32 stores data for use in automatically controlling vehicle 10. In various embodiments, data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. Route information may also be stored within data device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10. In one embodiment, as discussed in detail below, controller 34 is configured to determine the state of one or more pedal actuator assemblies provided within vehicle 10 (e.g., brake and/or accelerator pedals).

Communication system 36 is configured to wirelessly communicate information to and from other entities 48, such as but not limited to, other vehicles ("V2V" communication), infrastructure ("V2I" communication), remote transportation systems, and/or user devices. In an exemplary embodiment, communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

As can be appreciated, the subject matter disclosed herein provides certain enhanced features and functionality to what may be considered as a standard or baseline vehicle 10. To this end, a vehicle and vehicle based remote transportation system can be modified, enhanced, or otherwise supplemented to provide the additional features described in more detail below.

As mentioned above, systems and methods are described for determining the state of one or more pedal actuator assemblies. Stated another way, the present subject matter is directed at determining whether a pedal is in a normal operating state or in a fault state, such as a "stuck pedal" mode as described in further detail below.

Figure 2:
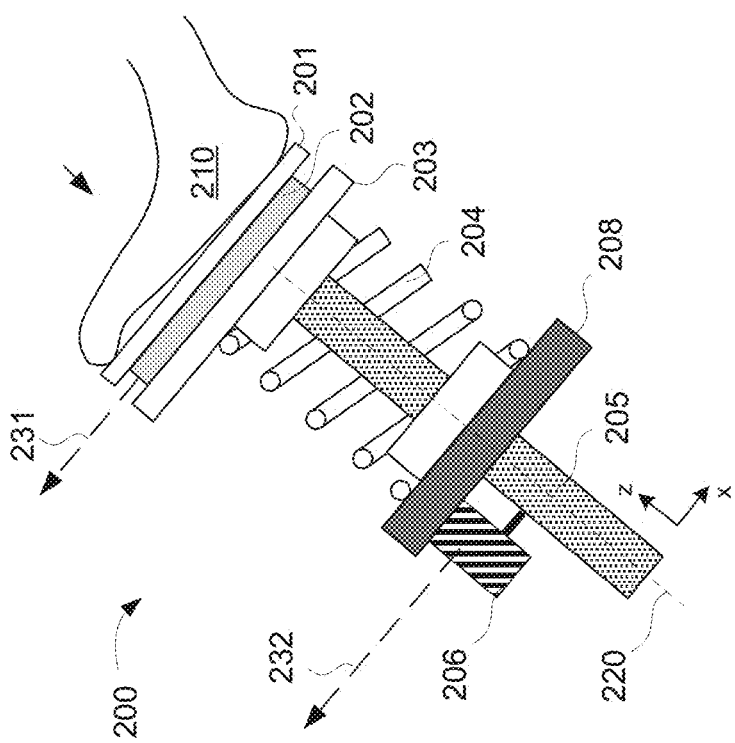
FIG. 2 illustrates a pedal actuation system in accordance with one embodiment.

Referring now to FIG. 2, a pedal actuator assembly (or simply "assembly") 200 in accordance with various embodiments is shown being operated via an occupant via a foot 210. Specifically, pedal actuator assembly 200 includes an actuator pedal 203 coupled to a contact plate 201 (i.e., a component intended to be directly contacted by foot 210) through a force sensor assembly 202 that produces a force sensor signal 231 indicative of the amount of compressive force applied to contact plate 201.

Actuator pedal 203 is rigidly coupled to a central shaft component 205 that is constrained such that it translates along an axis 230 (parallel to the "z" axis) in response to a compressive force applied by foot 210 to contact plate 201. A spring component 204 is coupled between actuator pedal 203 and an actuator mounting structure 208 to provide a force that, in the absence of a compressive force from foot 210 and in the normal operating state, causes actuator pedal 203 to return to its topmost or "rest" position. A position sensor assembly 206 is provided to determine the position of shaft 205 (and thereby actuator pedal 203) relative to mounting structure 208 and produce a position sensor signal 232 indicative thereof.

Pedal actuator assembly 200 correspond to any type of pedal actuator now known or later developed, including, without limitation, a brake pedal actuator, an accelerator pedal actuator, a clutch pedal actuator, or the like. In this regard, it will be appreciated that FIG. 2 presents a simplified version of a pedal actuator assembly, which in typical embodiments might also include a number of other components, such as stops, pads, gears, linkages, support members, bushings, and the like. Furthermore, the present embodiments are not limited to the particular geometry illustrated in FIG. 2. For example, spring component 204 might be implemented as a torsion spring rather than a linear spring component as illustrated. Similarly, while position sensor assembly 206 is shown as measuring linear movement of actuator pedal 203 (indirectly through shaft 205), position sensor assembly 206 might instead measure rotational movement of a structure (not illustrated) coupled to actuator pedal 203. While the applied force, force sensor assembly 202, and position sensor assembly are illustrated as substantially coaxial, the invention is not so limited.

Position sensor assembly 206 comprises any component or combination of components configured to produce a position sensor signal 232 indicative of the position of actuator pedal 203. Position sensor signal 232 may be analog or digital, and may be either absolute or relative. A variety of devices may be used for this purpose, including, for example, linear encoders, rotational encoders, capacitive transducers, eddy-current sensors, hall effect sensors, photodiode arrays, proximity sensors, string potentiometers, or the like. In an alternate embodiment, position sensor assembly 206 includes an optical camera component (part of sensor system 28 of FIG. 1) positioned underneath the front dashboard of vehicle 10 to determine the position of actuator pedal 203.

Force sensor assembly 202 comprises any component or combination of components configured to produce a force sensor signal 231 indicative of the force applied to actuator pedal 206 (e.g., via contact plate 201). A variety of force sensor devices (also referred to as load cells or pressure sensors) may employed for this purpose, including, for example, piezoelectric load cells, hydraulic load cells, pneumatic load cells, capacitive force sensors, electromagnetic force sensors, optical fiber force sensors, potentiometric force sensors, and the like.

In the interest of conciseness, it will often be stated herein that a force "is applied to" actuator pedal 203, even when such force is not directly applied thereto by foot 210. For example, in the embodiment shown in FIG. 2, any force applied by foot 210 will be necessarily be transmitted (via compression) through contact plate 201 and force sensor assembly 202. That is, stating that a force is applied to actuator pedal 203 may be equivalent in this context to stating that actuator pedal 203 experiences a force by virtue of a force directly applied to another component that is mechanically coupled to the actuator pedal 203.

Figure 3:
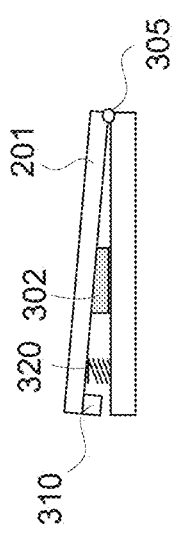
FIGS. 3-5 illustrate example pedal actuation systems in accordance with various embodiments.
Figure 4:
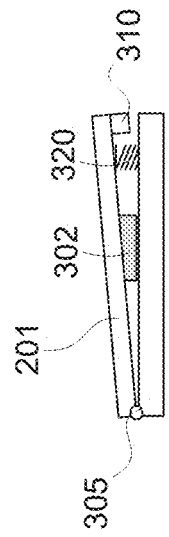
Figure 5:
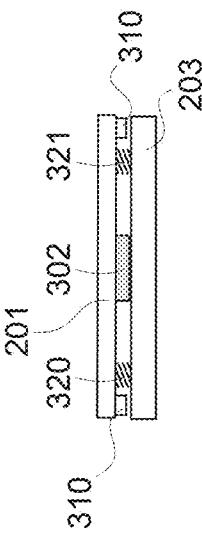

Force sensor assembly 202 is shown as a general functional block in FIG. 2, but in many implementations may include a variety of additional components. FIGS. 3-5 show just three example embodiments. In FIG. 3, for example, the contact plate 201 is shown to pivot about a hinge component 305 at the "heel end" of actuator pedal 203 (right side in this figure). This embodiment also includes a travel limiter 310 and return spring 320 near the "toe end" of actuator 203 (left side in this figure), along with a centrally located force sensor device 302. FIG. 4 shows an embodiment that is a reversed version of the embodiment shown in FIG. 3. That is, a hinge 305 is provided at the toe end of actuator pedal 203 while the travel limiter 310 and return spring 230 are provided at the heel end. FIG. 5 depicts an embodiment in which two return springs 320 and 321 as well as two travel limiters 310 are provided at opposite ends of actuator pedal 203. These embodiments are not intended to be limiting; for example, contact plate 201 may or may not experience rotational or translational movement during operation. That is, in cases in which force sensor is a solid state load cell or the like (a type that experiences negligible deformation in compression), springs 320, 321 and travel limiters 310 need not be employed.

Figure 6:
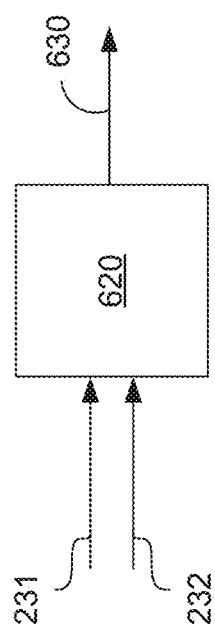
FIG. 6 is a dataflow diagram illustrating a system in accordance with various embodiments.

FIG. 6 is a dataflow diagram illustrating, generally, operation of a pedal state determination module (or simply "module") 620 that may be implemented by controller 34 of FIG. 1. In this regard, it will be understood that various embodiments of the system according to the present disclosure can include any number of sub-modules embedded within the controller 34. As can be appreciated, the sub-modules shown in FIG. 4 can be combined and/or further partitioned to operate similarly. Inputs to module 420 may be received from sensor system 28, received from other control modules (not shown) associated with the vehicle 10, received from the communication system 36, and/or determined/modeled by other sub-modules (not shown) within the controller 34 of FIG. 1.

Referring now to FIG. 6 along with FIGS. 1 and 2, module 620 is configured to receive force sensor signal 231 (from force sensor assembly 202 of FIG. 2) and position sensor signal 232 (from position sensor assembly 206 of FIG. 2) and produce an output 630 indicating the state of pedal actuator assembly 200. Module 620 may be implemented in a variety of ways, including, for example, a machine learning model that has undergone supervised or unsupervised learning, or a relatively simple decision tree based on the values associated with force sensor signal 231 and position sensor signal 232.

Output 630 may be a value that corresponds to one of a list of enumerated pedal state. In one embodiment, for example, output 630 is selected from two possible states: (1) "normal operating state" and (2) "fault state". In other embodiments, the fault state includes a plurality of possible states, each related to a different type of fault.

More particularly, referring once again to FIG. 2, one fault state might correspond to the case where force sensor signal 231 indicates a non-zero force (i.e., the operator is pressing foot 210 onto contact plate 201), but position sensor signal 232 indicates that actuator pedal 203 has not moved beyond its rest state. This fault mode corresponds to a scenario in which the operator cannot engage actuator pedal 203 (i.e., it is stuck in its rest position).

Another fault state might correspond to the case where force sensor signal 231 indicates zero force (i.e., the operator is not pressing foot 210 onto contact plate 201), but position sensor signal 232 indicates that actuator pedal 203 has moved beyond its rest state. This fault mode corresponds to a scenario in which actuator pedal 203 is stuck in an engaged position when the operator is not actually applying pressure to contact plate 201.

In general, the normal operating state may be characterized as cases in which the force sensor signal 231 is consistent with position sensor signal 232 (using any suitable criteria). For example, it would generally be the case that position sensor signal 232 indicates a non-zero value when force sensor signal 231 indicates a non-zero value (and the relationship between those values may be known a priori). Conversely, it would also be the case that position sensor signal 232 indicates a zero value (or known rest state value) when force sensor signal 231 indicates a zero value.

Figure 7:
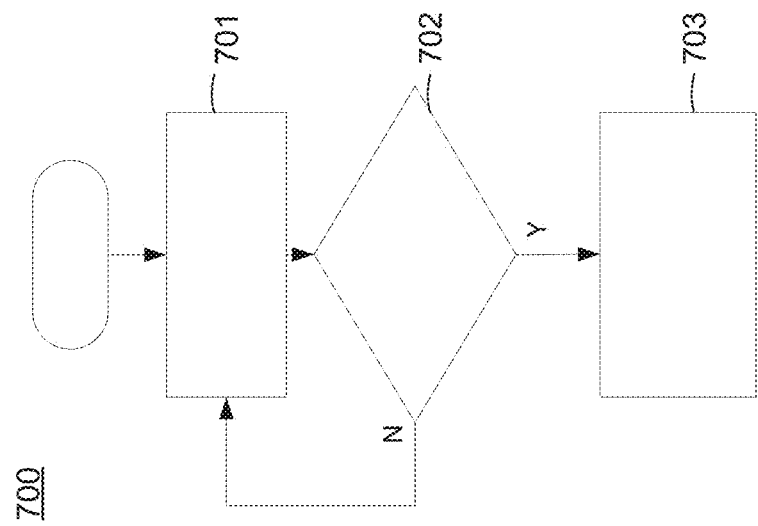
FIG. 7 is a flowchart illustrating a control method for controlling a vehicle in accordance with various embodiments.

Referring now to FIG. 7, and with continued reference to FIGS. 1-4, a flowchart illustrates a control method 700 that can be performed by the module 620 of FIG. 6 will now be described. As can be appreciated in light of the disclosure, the order of operation within the method is not limited to the sequential execution as illustrated, but may be performed in one or more varying orders as applicable and in accordance with the present disclosure. In various embodiments, the method 700 can be scheduled to run based on one or more predetermined events, and/or can run continuously during operation of the vehicle 10.

First, at 701, the system receives the position sensor signal 232 and force sensor signal 231 from the pedal actuator assembly 200. The nature of these signals is described in detail above.

Subsequently, at 702, the system queries whether the position sensor signal 232 and force sensor signal 231 are indicative of a fault state (output 630 of FIG. 6). If not, processing returns to 701, in which the position sensor signal 232 and force sensor signal 231 continue to be monitored. The determination of a fault state at 702 can be accomplished in a variety of ways, as described above. In one embodiment, for example, the system classifies as a fault state any state in which the force sensor signal is "inconsistent with" the position sensor signal. In a particular embodiment, the system looks for cases in which (1) the force signal 231 is non-zero while the position signal 232 is zero; or (2) the force signal 231 is zero and the position signal 232 is non-zero. Such cases generally correspond to what has been described as "stuck pedal" fault modes.

Finally, at 703, the system performs a remedial action based on the fault state and the nature of the pedal actuator assembly 200. This remedial action may take a variety of forms and may involve a variety of subsystems shown in FIG. 1 (including, for example, brake system 62).

In the case where pedal actuator assembly 200 is a brake pedal assembly, the remedial action may include one or more of: notifying the user of a fault (e.g., through the use of a dashboard message, audio alarm, or the like), limiting the speed of vehicle 10, and enabling appropriate braking control.

In the case where pedal actuator assembly 200 is an accelerator pedal assembly, the remedial action may include one or more of: notifying the user of a fault (e.g., through the use of a dashboard message, audio alarm, or the like), limiting the speed of or simply stopping vehicle 10, and enabling appropriate acceleration control.

In some embodiments, the system performs a diagnostic test of both the circuitry used to generate position sensor signal 232 and the circuitry used to generate force sensor signal 231 prior to performing steps 701 and 702, thereby providing additional confidence that any fault condition is actually occurring.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of determining a state of a pedal actuator system within a vehicle, the method comprising:
   receiving a position sensor signal indicative of a position of an actuator pedal within the pedal actuator system;
   receiving a force sensor signal indicative of a compressive force applied to the actuator pedal; and
   determining, with a processor, a state of the actuator pedal based on a decision tree that evaluates the position sensor signal and the force sensor signal, wherein the state of the actuator pedal is one of a normal operating state and a fault state, wherein the decision tree:
   determines the state of the actuator pedal to be the fault state when the force sensor signal indicates a non-zero force, and the position sensor signal indicates that actuator pedal has not moved beyond a rest state;
   determines the state of the actuator pedal to be the fault state when the force sensor signal indicates zero force, and the position sensor signal indicates that the actuator pedal has moved beyond a rest state; and
   determines the state of the actuator pedal to be the normal operating state when the force sensor signal indicates a non-zero force, and the position sensor signal indicates that the actuator pedal has moved beyond a rest state.

2. The method of claim 1, wherein the actuator pedal is a brake pedal.

3. The method of claim 1, wherein the actuator pedal is an acceleration pedal.

4. The method of claim 1, further including performing a remedial action if the state of the actuator pedal is a fault state.

5. The method of claim 4, wherein the remedial action includes at least one of providing a notification of the fault state, modifying the braking of the vehicle, and modifying an acceleration of the vehicle.

6. The method of claim 1, further performing a diagnostic test of the position sensor assembly and the force sensor assembly prior to determining the state of the actuator pedal.

7. A pedal state determination system for a vehicle, the system comprising:
   a pedal actuator system comprising an actuator pedal, a force sensor assembly configured to produce a force sensor signal indicative of a force applied to the actuator pedal, and a position sensor assembly configured to produce a position sensor signal indicative of the position of the actuator pedal; and
   a pedal state determination module, including a processor, configured to determine a state of the actuator pedal based on a decision tree that evaluates the position sensor signal and the force sensor signal, wherein the state of the actuator pedal is one of a normal operating state and a fault state, wherein the decision tree:
   determines the state of the actuator pedal to be the fault state when the force sensor signal indicates a non-zero force, and the position sensor signal indicates that actuator pedal has not moved beyond a rest state;
   determines the state of the actuator pedal to be the fault state when the force sensor signal indicates zero force, and the position sensor signal indicates that the actuator pedal has moved beyond a rest state; and determines the state of the actuator pedal to be the normal operating state when the force sensor signal indicates a non-zero force, and the position sensor signal indicates that the actuator pedal has moved beyond a rest state.

8. The system of claim 7, wherein the actuator pedal is a brake pedal.

9. The system of claim 7, wherein the actuator pedal is an acceleration pedal.

10. The system of claim 7, further including performing a remedial action if the state of the actuator pedal is a fault state.

11. The system of claim 10, wherein the remedial action includes at least one of providing a notification of the fault state, modifying the braking of the vehicle, and modifying an acceleration of the vehicle.

12. The system of claim 7, wherein the pedal state determination module performs a diagnostic test of the position sensor assembly and the force sensor assembly prior to determining the state of the actuator pedal.

13. A vehicle comprising:
a pedal actuator system comprising an actuator pedal, a force sensor assembly configured to produce a force sensor signal indicative of a force applied to the actuator pedal, and a position sensor assembly configured to produce a position sensor signal indicative of the position of the actuator pedal; and
a pedal state determination module, including a processor, configured to determine a state of the actuator pedal based on a decision tree that evaluates the position sensor signal and the force sensor signal, wherein the state of the actuator pedal is one of a normal operating state and a fault state, wherein the decision tree:
determines the state of the actuator pedal to be the fault state when the force sensor signal indicates a non-zero force, and the position sensor signal indicates that actuator pedal has not moved beyond a rest state;
determines the state of the actuator pedal to be the fault state when the force sensor signal indicates zero force, and the position sensor signal indicates that the actuator pedal has moved beyond a rest state; and
determines the state of the actuator pedal to be the normal operating state when the force sensor signal indicates a non-zero force, and the position sensor signal indicates that the actuator pedal has moved beyond a rest state.

14. The vehicle of claim 13, wherein the actuator pedal is a brake pedal.

* * * * *